(12) United States Patent
Kemp et al.

(10) Patent No.: US 12,003,841 B2
(45) Date of Patent: Jun. 4, 2024

(54) EDGE INSPECTION SYSTEM FOR INSPECTION OF OPTICAL DEVICES

(71) Applicant: Applied Materials, Inc., Santa Clara, CA (US)

(72) Inventors: Michael David-Scott Kemp, San Jose, CA (US); Jinxin Fu, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/661,928

(22) Filed: May 4, 2022

(65) Prior Publication Data

US 2022/0368817 A1   Nov. 17, 2022

Related U.S. Application Data

(60) Provisional application No. 63/188,524, filed on May 14, 2021.

(51) Int. Cl.
*H04N 5/225* (2006.01)
*G06T 7/00* (2017.01)
*H04N 23/55* (2023.01)
*H04N 23/56* (2023.01)

(52) U.S. Cl.
CPC ........... *H04N 23/56* (2023.01); *G06T 7/0004* (2013.01); *H04N 23/55* (2023.01); *G06T 2207/30148* (2013.01)

(58) Field of Classification Search
CPC ....... H04N 23/56; H04N 23/55; G06T 7/0004
See application file for complete search history.

(56) References Cited

U.S. PATENT DOCUMENTS

| | | | |
|---|---|---|---|
| 7,508,504 B2 | 3/2009 | Jin et al. | |
| 8,087,799 B2 | 1/2012 | Hahn et al. | |
| 10,663,393 B2 * | 5/2020 | Liu | G01N 21/65 |
| 2013/0016206 A1 | 1/2013 | Zimmer et al. | |
| 2015/0241680 A1 * | 8/2015 | Oba | G06T 5/50 348/79 |
| 2017/0133253 A1 | 5/2017 | Fischer et al. | |
| 2019/0178808 A1 | 6/2019 | Muhr et al. | |
| 2021/0161044 A1 * | 5/2021 | Nagaishi | G06T 7/80 |

OTHER PUBLICATIONS

International Search Report and Written Opinion for International Application No. PCT/US2022/027609 dated Aug. 10, 2022.

* cited by examiner

*Primary Examiner* — Jonathan R Messmore
(74) *Attorney, Agent, or Firm* — Patterson + Sheridan, LLP

(57) ABSTRACT

Embodiments described herein relate to an inspection system for illumination of optical devices. The inspection system includes a stage, a focusing lens, a light source, a reflective surface, and a camera. The inspection system is operable to provide a light to a substrate. The substrate is positioned on the inspection system such that an edge of the substrate is exposed. The inspection system focuses light to the edge such that the light propagates through the substrate. The light is coupled out of the substrate, illuminating one or more optical devices disposed on the substrate. The illumination allows the camera to capture images to be inspected. The images are inspected to detect defects of the substrate.

20 Claims, 5 Drawing Sheets

EDGE INSPECTION SYSTEM FOR INSPECTION OF OPTICAL DEVICES

CROSS-REFERENCE TO RELATED APPLICATIONS

This application claims benefit of U.S. Provisional Patent Application No. 63/188,524, filed May 14, 2021, which is herein incorporated by reference in its entirety.

BACKGROUND

Field

Embodiments of the present disclosure generally relate to optical devices. More specifically, embodiments of the present disclosure relate to an inspection system and a method for inspection of optical devices.

Description of the Related Art

Optical devices including waveguide combiners, such as augmented reality waveguide combiners, and flat optical devices, such as metasurfaces, are used to assist in overlaying images. Generated light is propagated through the optical device until the light exits the optical device and is overlaid on the ambient environment. Identification of defects on the optical devices will increase the overall performance of the optical devices manufactured. However, detecting defects on the optical devices may be challenging and time consuming. For example, there may be structures disposed in or on the optical devices and it may be difficult to inspect the optical devices from above due to the structures having sub-wavelength dimensions.

It is beneficial to inspect the optical devices with high throughput to ensure that there are no defects in the optical devices. It is also beneficial to have an inspection process that may be integrated into the manufacturing methods of the optical devices. Directing light to the optical devices can improve the visibility of the structures disposed thereon, however directing the light to the optical devices efficiently and with sufficient contrast such that the structures may be inspected is difficult. As such, what is needed in the art is an improved inspection system.

SUMMARY

In one embodiment an inspection system is provided. The inspection system includes a stage. The stage includes an interior support operable to retain a substrate having one or more optical devices disposed thereon. The stage further includes an exterior support and a bottom support. The inspection system further includes a cover disposed on the exterior support. The interior support, the exterior support, the bottom support, and the cover define an interior region. The interior support and the cover define a slit. The inspection system further includes a light source operable to emit light. The light source is disposed in the interior region. The inspection system further includes a focusing lens operable to focus the light to the slit. The focusing lens is optically coupled to the light source in the interior region.

In another embodiment, a method of inspection is provided. The method includes directing light from a light source to a substrate on an interior support of a stage of an inspection system. The substrate is positioned such that an edge of the substrate is aligned with a slit in the inspection system and the slit is defined by the interior support and a cover disposed on an exterior support of the stage. The light source is disposed in an interior region of the stage and directs the light through the slit to the edge of the substrate to illuminate one or more optical devices disposed in or on the substrate. The method further includes capturing images of the one or more optical devices and inspecting the images for defects of the one or more optical devices.

In yet another embodiment, a method of inspection is provided. The method includes forming dicing paths along a perimeter of one or more optical devices disposed in or on a substrate and directing light from a light source to a substrate on an interior support of a stage of an inspection system. The substrate is positioned such that an edge of the substrate is aligned with a slit in the inspection system and the slit is defined by the interior support and a cover disposed on an exterior support of the stage. The light source is disposed in an interior region of the stage and directs the light through the slit to the edge of the substrate to illuminate one or more optical devices disposed in or on the substrate. The method further includes capturing images of the one or more optical devices and inspecting the images for defects along the dicing paths disposed around the perimeter of the one or more optical devices.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to an inspection system and a method for inspection of optical devices. The inspection system includes a stage. The stage includes an interior support operable to retain a substrate having one or more optical devices disposed thereon. The stage further includes an exterior support and a bottom support. The inspection system further includes a cover disposed on the exterior support. The interior support, the exterior support, the bottom support, and the cover define an interior region. The interior support and the cover define a slit. The inspection system further includes a light source operable to emit light. The light source is disposed in the interior region. The inspection system further includes a focusing lens operable to focus the light to the slit. The focusing lens is optically coupled to the light source in the interior region.

In one embodiment, which can be combined with other embodiments described herein, the method includes positioning a substrate on an interior support of a stage of an inspection system. The substrate is positioned such that an edge of the substrate is aligned with a slit in the inspection system. The slit is defined by the interior support and a cover disposed on an exterior support of the stage. The method further includes directing light from a light source disposed in an interior region of the stage through the slit to the edge of the substrate to illuminate one or more optical devices disposed in or on the substrate. The method further includes capturing images of the one or more optical devices. The method further includes inspecting the images for defects of the one or more optical devices. In another embodiment, which can be combined with other embodiments described herein, the method includes forming dicing paths along a perimeter of one or more optical devices disposed in or on a substrate. The method further includes positioning the substrate on an interior support of a stage of an inspection system. The substrate is positioned such that an edge of the substrate is aligned with a slit in the inspection system. The slit is defined by the interior support and a cover disposed on an exterior support of the stage. The method further includes directing light from a light source disposed in an interior region of the stage through the slit to the edge of the substrate to illuminate the one or more optical devices. The method further includes capturing images of the one or more optical devices. The method further includes inspecting the images for defects along the dicing paths disposed around the perimeter of the one or more optical devices.

Figure 1A:
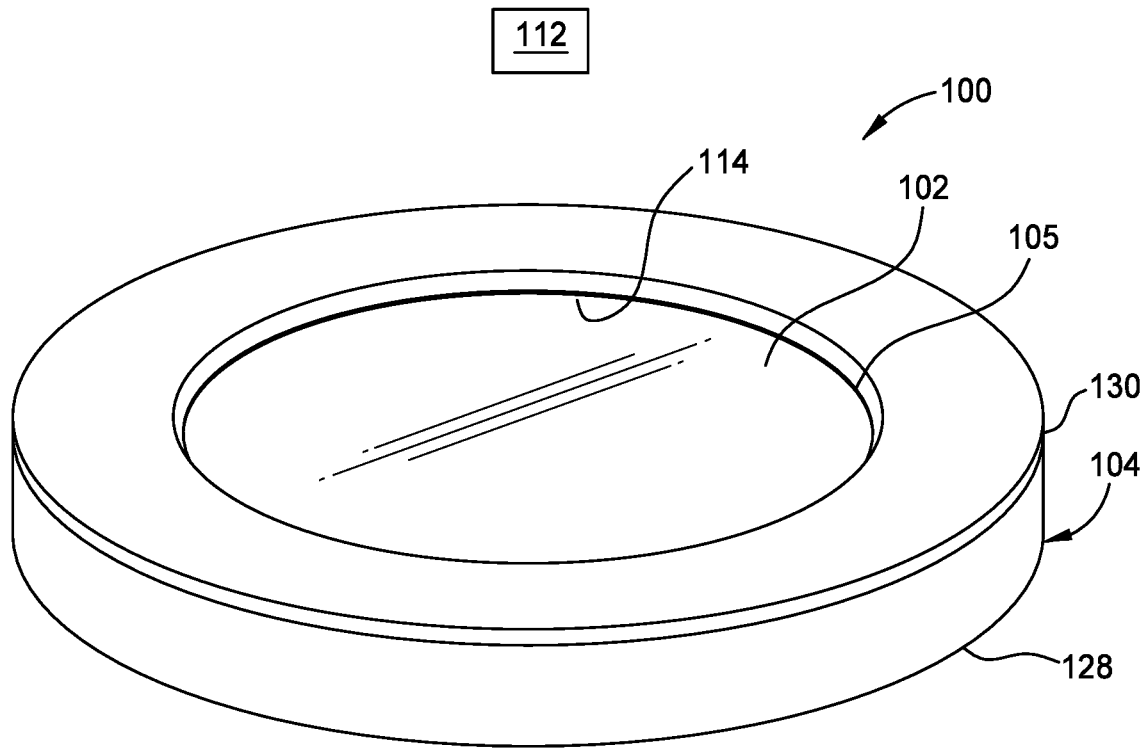
FIG. 1A is a schematic, perspective view of an inspection system according to embodiments.
Figure 1B:
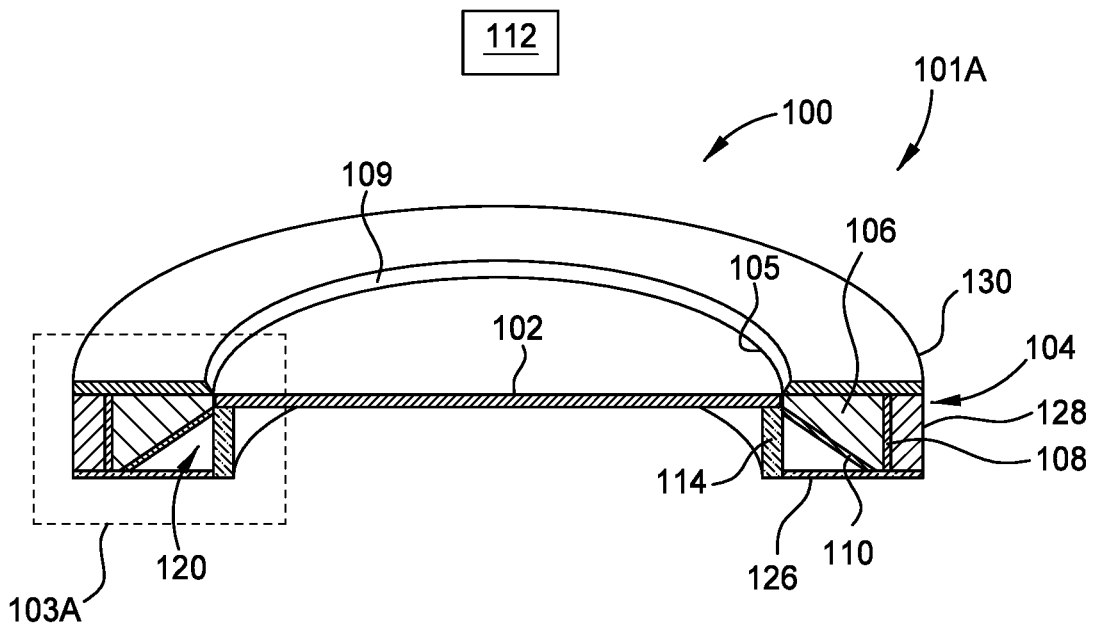
FIG. 1B is a schematic, cross-sectional view of a first configuration of an inspection system according to embodiments.
Figure 1C:
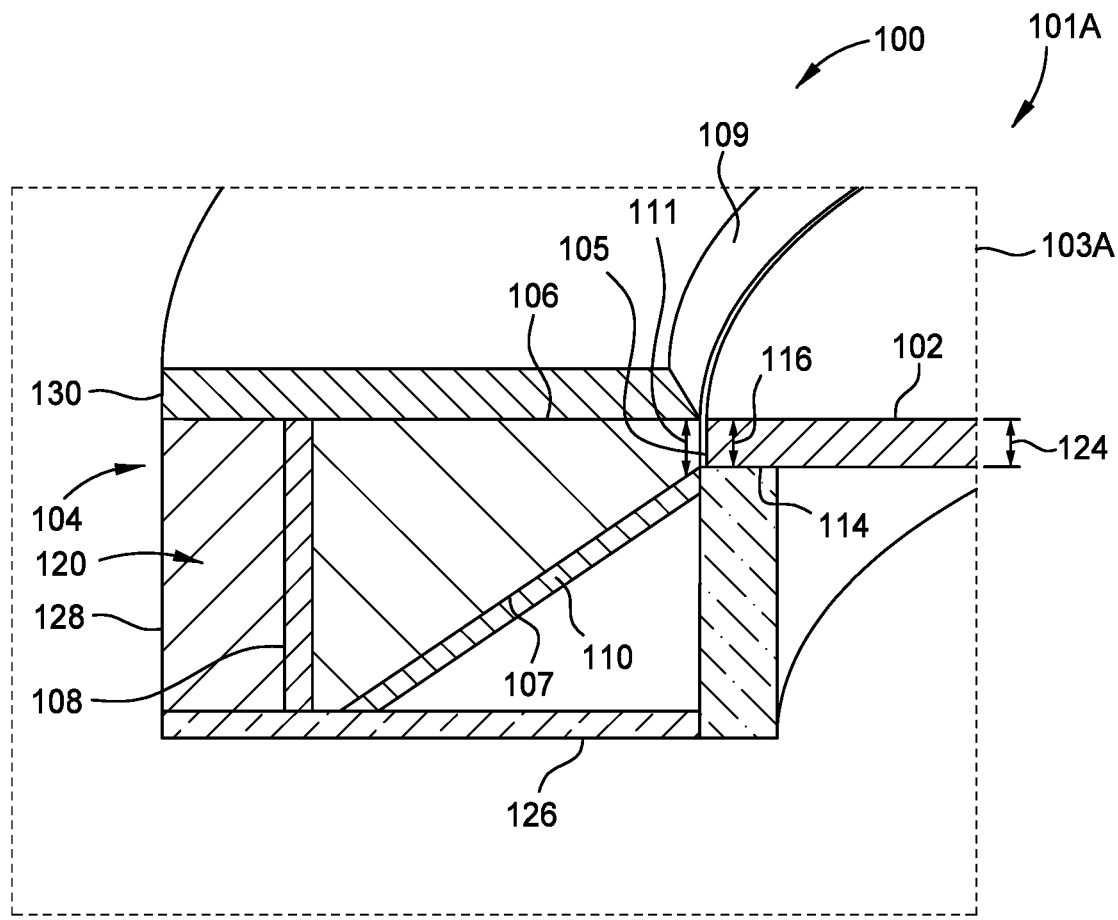
FIG. 1C is a schematic, cross-sectional view of a section of a first configuration of an inspection system according to embodiments.
Figure 1D:
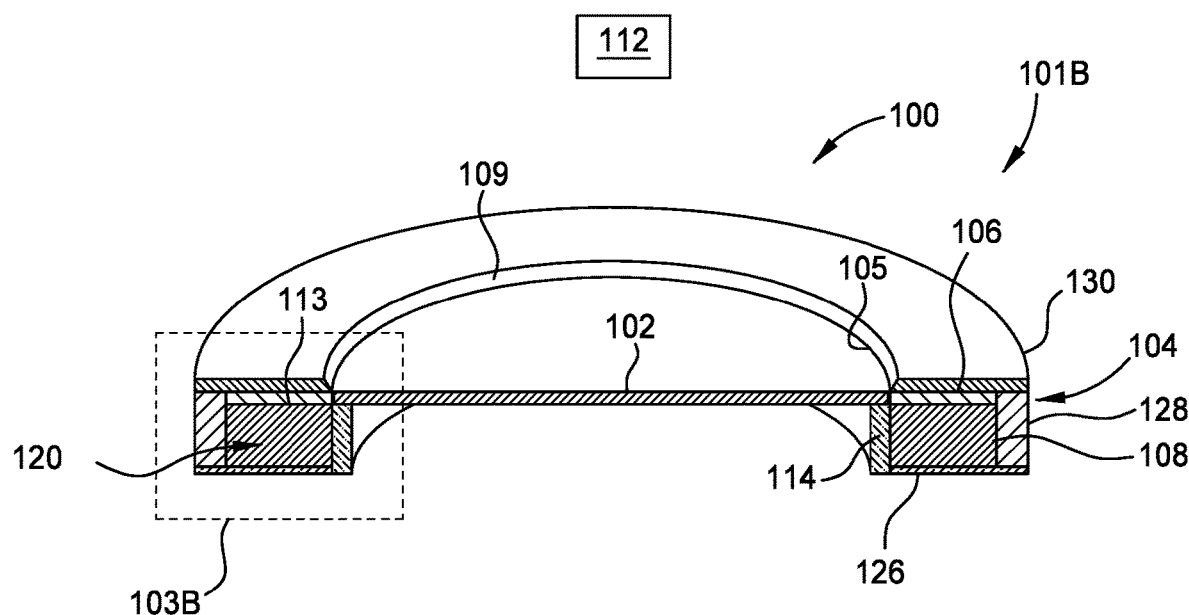
FIG. 1D is a schematic, cross-sectional view of a second configuration of an inspection system according to embodiments.
Figure 1E:
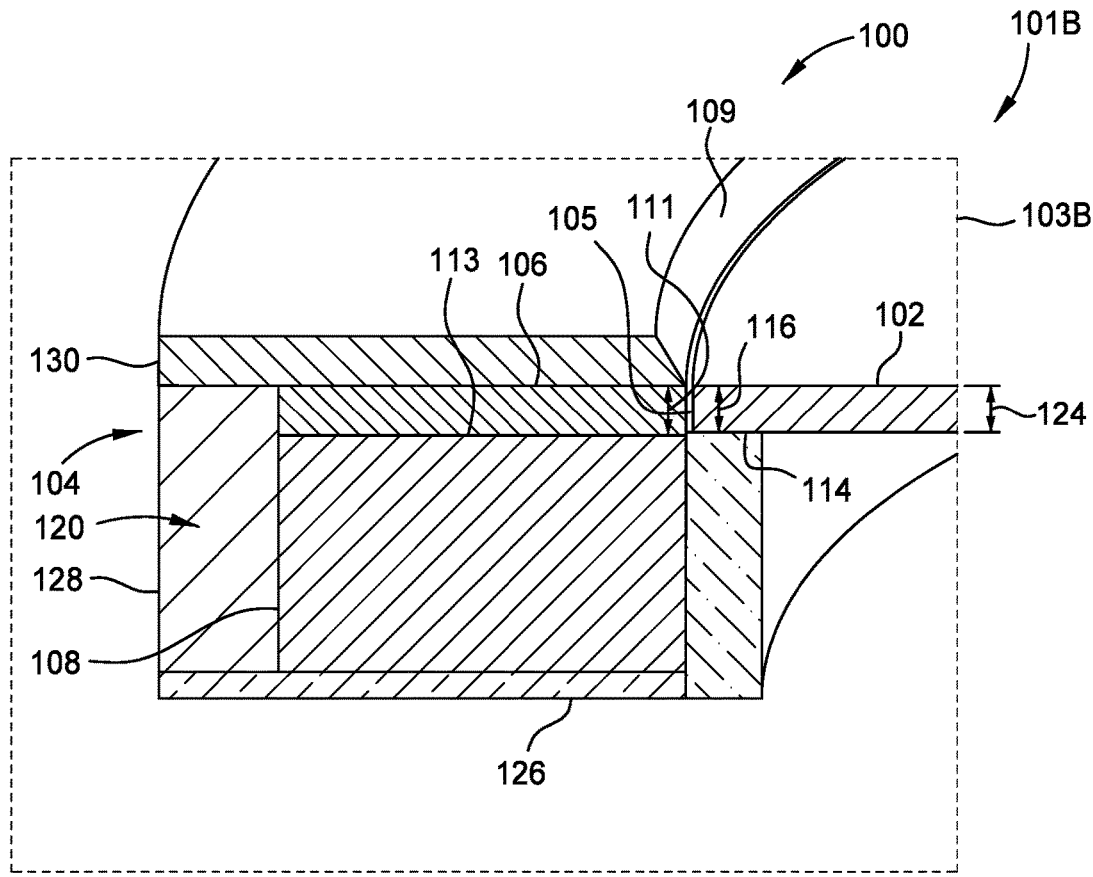
FIG. 1E is a schematic, cross-sectional view of a section of a second configuration of an inspection system according to embodiments.

FIG. 1A is a schematic, perspective view of an inspection system 100. The inspection system 100 includes a first configuration 101A as shown in FIGS. 1B and 1C. The inspection system 100 includes a second configuration 101B as shown in FIGS. 1D and 1E. The inspection system 100 is configured to retain a substrate 102. The inspection system 100 is operable to direct light to the substrate 102. Specifically, the inspection system 100 is operable to direct light to an edge 105 of the substrate 102. The light propagates through the substrate 102 via total internal reflection (TIR). The light is coupled out of the substrate 102 through one or more optical devices (shown in FIG. 2) disposed on the substrate 102. The light illuminates the substrate 102 such that the one or more optical devices (shown in FIG. 2) may be visible to a camera 112 disposed above the inspection system 100. Therefore, the inspection system is operable to be utilized for inspection and identification of defects of the substrate 102 and the one or more optical devices (shown in FIG. 2).

The inspection system 100 may be positioned in an in-line inspection station. Thus, one or more substrates 102 may be inspected individually. For example, the one or more substrates 102 may be inspected at multiple stages of the manufacturing process. The inspection system 100 may be disposed on manufacturing equipment utilized during the manufacturing process.

FIG. 1B is a schematic, cross-sectional view of a first configuration 101A of the inspection system 100. FIG. 1D is a schematic, cross-sectional view of a second configuration 101B of the inspection system 100. As shown in FIGS. 1A and 1B, the first configuration 101A of the inspection system 100 includes a stage 104, a cover 130, a focusing lens 106, a light source 108, a reflective surface 110, and the camera 112. As shown in FIGS. 1D and 1E, the second configuration of the inspection system 100 includes a stage 104, a cover 130, a focusing lens 106, a light source 108, and the camera 112.

The stage 104 has an interior support 114, a bottom support 126, and an exterior support 128. The cover 130 is disposed over the stage 104. The cover 130 is coupled to the exterior support 128. The cover 130, the interior support 114, the bottom support 126, and the exterior support 128 define an interior region 120 of the inspection system 100. The cover 130 includes a cover surface 109. The cover surface 109 is angled relative to bottom support 126. The cover surface 109 is angled inwards toward the interior of the inspection system 100. For example, the cover surface 109 is angled toward the substrate 102 retained in the inspection system 100.

The focusing lens 106, the light source 108, and the reflective surface 110 are disposed in the interior region 120. The interior support 114 is operable to support the substrate 102. The substrate 102 sits on the interior support 114 such that the interior support 114 does not contact the one or more optical devices (shown in FIG. 2). The interior support 114 includes a horizontal surface to support the substrate 102. In one embodiment, which can be combined with other embodiments described herein, the cover 130 is opaque such that there is a high contrast between the substrate 102 when illuminated and the cover 130. The cover 130 includes an opaque material. The opaque material includes, but is not limited to, an aluminum containing material. The aluminum containing material can be anodized aluminum or aluminum impregnated with carbon filled PolyEtherEtherKetone (PEEK). Additionally, the cover 130 may be coated in a light absorbing material to create the high contrast between the substrate 102 when illuminated and the cover 130. For example, the light absorbing material is formed with an anodization process. The stage 104 may be configured to retain any substrate 102. The stage 104 may be configured to correspond to any contour of the substrate 102. Although the stage 104 shown in FIGS. 1A-1E is configured to retain a circular substrate, the inspection system 100 is not limited to the shape or size of the substrate 102. For example, the inspection system 100 may be configured to retain a rectangular substrate.

The camera 112 is disposed above the substrate 102. The camera 112 is operable to capture images of the substrate 102 and the one or more optical devices (shown in FIG. 2) when illuminated by the inspection system 100. Directing the light through the substrate 102 and coupling the light out of the substrate 102 creates a high contrast between the material of the substrate 102 and the one or more optical devices (shown in FIG. 2) such that the one or more optical devices (shown in FIG. 2) are visible in the images. The images may be inspected to identify defects in the substrate 102. The illumination system is utilized to inspect the substrate 102 to detect whether there are at least one of fall-on particles, missing patterns, discoloration, or film non-uniformity of the substrate 102.

Additionally, dicing paths along the perimeter of the one or more optical devices (shown in FIG. 2) define the location that a laser ablation process or a filamentation process occurred prior to removing the optical devices from the substrate 102. The dicing paths may be inspected with the inspection system 100 to determine the quality of the dicing paths and ensure there are no stress cracks or defects along the dicing paths.

FIG. 1C is a schematic, cross-sectional view of a section 103A of a first configuration 101A of an inspection system 100. The light source 108 is disposed in the interior region 120 of the stage 104. The light source 108 is coupled to the exterior support 128 within the interior region 120. The light source 108 is provided power via an external power connection formed through the exterior support 128. For example, the exterior support includes a bumped out connector to provide power. The light source 108 is operable to emit light. The light source 108 may emit light suitable for TIR in the substrate 102. The light source 108 includes at least one of one or more light-emitting diodes or one or more ultraviolet light sources. The one or more light-emitting diodes may be one or more of red, green, blue, or white light-emitting diodes. In one embodiment, which can be combined with other embodiments described herein, the light source 108 includes a flexible printed circuit board disposed along the exterior support 128 of the stage 104. Therefore, light would be distributed equally to the substrate 102. Light-emitting diodes are disposed over the printed circuit board such that light is directed toward the substrate 102. The light source 108 is disposed vertically in the interior region 120. The light source 108 is parallel to the edge 105 of the substrate 102. In one example, the light source 108 completely encircles the stage 104. In another embodiment, which can be combined with other embodiments described herein, one or more light sources 108 are disposed along the exterior support 128 such that the one or more light sources 108 can direct light to portions of the substrate 102 corresponding to the one or more light sources 108.

The focusing lens 106 is operable to receive the light emitted from the light source 108. The focusing lens 106 directs the light to the edge 105 of the substrate 102. The focusing lens 106 includes, but is not limited to, plastic, quartz, glass, or combinations thereof. The plastic may be a polycarbonate. The substrate 102 is disposed on the interior support 114. The focusing lens 106 may be bonded to the cover 130, the exterior support 128, and/or the bottom support 126. The focusing lens 106 is configured to be disposed along the interior region 120 of the stage 104. The light travels through the focusing lens 106 in the interior region 120 to the substrate 102. The focusing lens 106 includes a lens surface 107 in the first configuration 101a. The lens surface 107 faces the interior region 120. The lens surface 107 is disposed at an angle relative to the bottom support 126. The lens surface 107 is at an angle relative to the bottom support 126 from about 5° to about 85°, about 10° to about 80°, about 15° to about 80°, about 20° to about 75°, about 25° to about 70°, about 30° to about 65°, about 35° to about 60°, about 40° to about 55°, or about 45° to about 60°.

The focusing lens 106 is a fiber optic material configured to funnel light to a slit 116. The focusing lens 106 may have a square or rectangular cross-section. For example, the focusing lens 106 directs the light through a slit 116. The slit 116 is defined as the distance where the light emitted from the light source 108 may escape from the interior region 120. The slit 116 is further defined as the distance between the interior support 114 and the cover 130. The edge 105 of the substrate 102 is disposed on the interior support 114 such that the focusing lens 106 directs the light through the slit 116 to the edge 105. The slit 116 is between about 0.1 mm and about 2 mm. The slit 116 corresponds to a thickness 124 of the substrate 102 such that the edge 105 is exposed to the maximum amount of light from the light source 108. The thickness 124 is between about 0.1 mm and about 2 mm. An exit thickness 111 of the focusing lens 106, corresponding to the thickness of a portion of the focusing lens adjacent the slit 116, is substantially equal to a thickness 124 of the substrate 102 and the slit 116.

The reflective surface 110 is disposed between the interior support 114 and the bottom support 126. In one example, the reflective surface 110 is coupled to the interior support 114 and the bottom support 126. In one embodiment, which can be combined with other embodiments described herein, the reflective surface 110 is a film, sheet, or foil of reflective material coupled to the focusing lens 106. In another example, the reflective surface 110 is a reflective tape, a foil material, or a polished metallic material. The reflective surface 110 lines the exterior surface of the focusing lens 106. The reflective surface 110 can be disposed at an angle relative to the bottom support 126. For example, the reflective surface 110 is disposed at an angle relative to the bottom support 126 from about 5° to about 85°, about 10° to about 80°, about 15° to about 80°, about 20° to about 75°, about 25° to about 70°, about 30° to about 65°, about 35° to about 60°, about 40° to about 55°, or about 45° to about 60°. The reflective surface 110 assists in directing the light from the light source 108 to the edge 105 of the substrate 102. In one embodiment, which can be combined with other embodiments described herein, the reflective surface 110 may be disposed on the interior region 120 of the stage 104. In one embodiment, which can be combined with other embodiments described herein, the reflective surface 110 will reflect ultraviolet light when the light source 108 includes one or more ultraviolet light sources. The reflection surface 110 and the focusing lens 106 direct the light to the substrate 102 with increased efficiency, as all or the majority of the light is directed to the edge 105.

FIG. 1E is a schematic, cross-sectional view of a section 103B of a second configuration 101B of an inspection system 100, as shown in FIG. 1D. The light source 108 is disposed in the interior region 120 of the stage 104. The light source 108 is coupled to the exterior support 128, the bottom support 126, and the interior support 114. The light source 108 is operable to emit light. The light source 108 may emit light suitable for TIR in the substrate 102. The light source 108 includes at least one of one or more light-emitting diodes or one or more ultraviolet light sources. The one or more light-emitting diodes may be one or more of red, green, blue, or white light-emitting diodes. In one embodiment, which can be combined with other embodiments described herein, the light source 108 includes a rigid printed circuit board configured such that the printed circuit board is disposed along the interior region 120 of the stage 104. Light-emitting diodes are disposed over the printed circuit board such that light is directed toward the cover 130 and the focusing lens 106. Therefore, light is distributed equally to the substrate 102. In one example, the light source 108 completely encircles the stage 104. In another embodiment, which can be combined with other embodiments described herein, one or more light sources 108 are disposed along the interior region 120 such that the one or more light sources 108 can direct light to portions of the substrate 102 corresponding to the one or more light sources 108.

The focusing lens 106 is operable to receive the light emitted from the light source 108. The focusing lens 106 is disposed over a top surface 113 of the light source 108. The light source 108 emits light in a vertical direction towards the focusing lens 106. In some embodiments, the focusing lens 106 is positioned horizontally on top surface 113 of the light source 108. The focusing lens 106 is disposed along the entire interior region 120 in a circular shape according to the stage 104. The focusing lens 106 directs the light to the edge 105 of the substrate 102. The focusing lens 106 includes, but is not limited to, plastic, quartz, glass, or combinations thereof. The plastic may be a polycarbonate. The substrate 102 is disposed on the interior support 114. The focusing lens 106 may be bonded to the cover 130, the exterior support 128, the light source 108, and/or the interior support 114. In one embodiment, the cover 130, the interior support 114, the bottom support 126, and the exterior support 128 are machined such that the light from the light source 108 is tunneled through the focusing lens 106 to the substrate 102. The focusing lens 106 is configured to be disposed along the interior region 120 of the stage 104.

The focusing lens 106 is a fiber optic material configured to funnel light to a slit 116. The focusing lens 106 may have a square or rectangular cross-section. The light travels through the focusing lens 106 in the interior region 120 to the substrate 102. The focusing lens 106 directs the light through a slit 116. The slit 116 is defined as the distance where the light emitted from the light source 108 may escape from the interior region 120. The slit 116 is defined as the distance between the interior support 114 and the cover 130. The edge 105 of the substrate 102 is disposed on the interior support 114 such that the focusing lens 106 directs the light through the slit 116 to the edge 105. The slit 116 is between about 0.1 mm and about 2 mm. The slit 116 corresponds to a thickness 124 of the substrate 102 such that the edge 105 is exposed to the maximum amount of light from the light source 108. The thickness 124 is between about 0.1 mm and about 2 mm. An exit thickness 111 of the focusing lens 106, corresponding to the thickness of a portion of the focusing lens adjacent the slit 116, is substantially equal to a thickness 124 of the substrate 102 and the slit 116.

Figure 2:
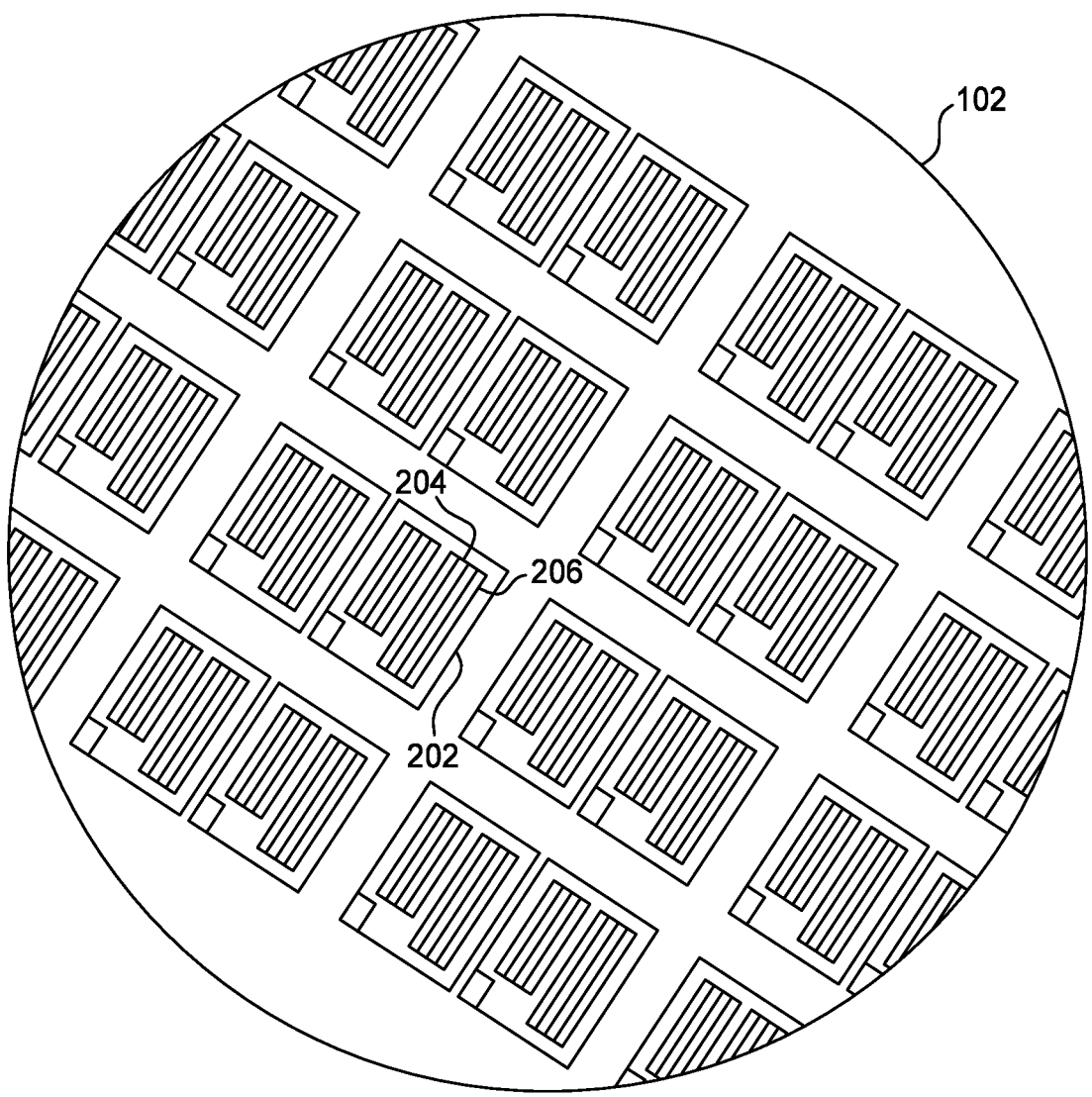
FIG. 2 is a schematic, top view of a substrate according to embodiments.

FIG. 2 is a schematic, top view of a substrate 102. The substrate 102 is operable to be retained in the inspection system 100. The substrate 102 is operable to be illuminated by the inspection system 100. The substrate 102 includes one or more optical devices 202. The one or more optical devices 202 include optical device structures 206. In one embodiment, which can be combined with other embodiments described herein, regions of the optical device structures 206 correspond to one or more gratings 204. The one or more optical devices 202 are fabricated on the substrate 102. The one or more optical devices 202 may be disposed in or on the substrate 102. The substrate 102 may include, but is not limited to, silicon (Si), silicon nitride (SiN), silicon dioxide ($SiO_2$), fused silica, quartz, silicon carbide (SiC), germanium (Ge), silicon germanium (SiGe), indium phosphide (InP), gallium arsenide (GaAs), gallium nitride (GaN), sapphire, or combinations thereof. In one embodiment, which can be combined with other embodiments described herein, the one or more optical devices 202 are flat optical devices, such as metasurfaces. In another embodiment, which can be combined with other embodiments described herein, the one or more optical devices 202 are waveguide combiners, such as an augmented reality waveguide combiners.

The substrate 102 can be any substrate used in the art, and can be either opaque or transparent depending on the use of the substrate. Additionally, substrate selection may further include varying shapes, thickness, and diameters of the substrate 102. For example, the substrate 102 can be a single crystal wafer of any size, such as having a radius from about 150 mm to about 450 mm. The substrate 102 may have any number of the one or more optical devices 202 disposed thereon and is not limited by the number of the one or more optical devices 202 shown in FIG. 2. The substrate 102 is positioned in the inspection system 100 such that the one or more optical devices 202 are illuminated and have a high contrast with the material of the substrate 102.

Figure 3:
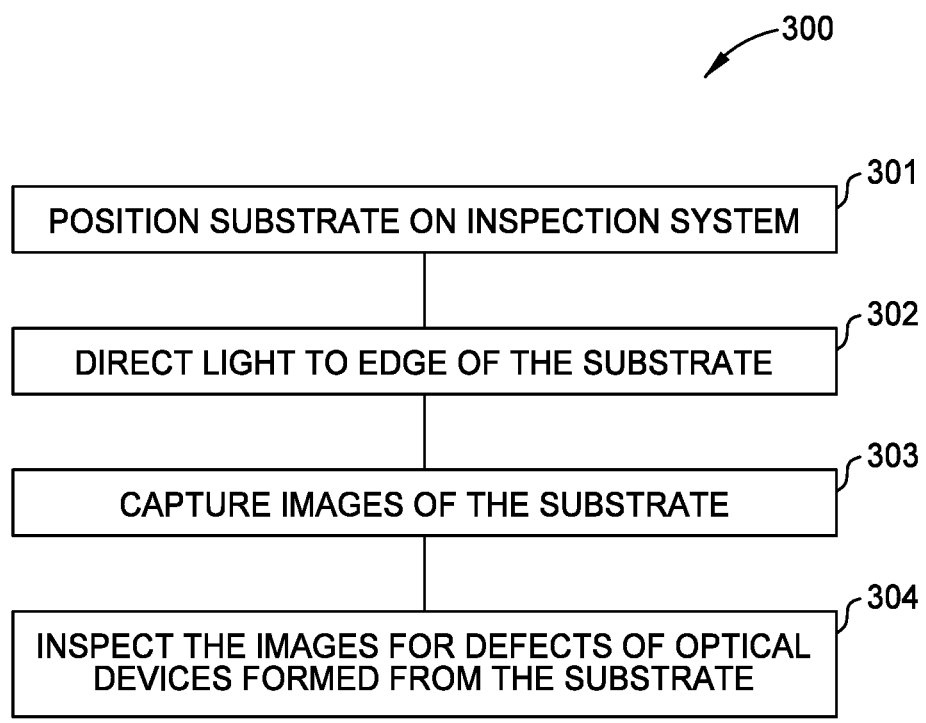
FIG. 3 is a flow diagram of a method for inspecting of optical devices according to embodiments.

FIG. 3 is a flow diagram of a method 300 for inspecting of optical devices. To facilitate explanation, the method 300 will be described with reference to the inspection system 100 of FIGS. 1A-1E. The first configuration 101A and the second configuration 101B of the inspection system 100 are operable to be utilized with the method 300 described herein. However, it is to be noted that inspection systems other than the inspection system 100 may be utilized in conjunction with the method 300.

At operation 301, a substrate 102 is positioned. The substrate 102 may be positioned on an interior support 114 of the inspection system 100. The substrate 102 is positioned such that an edge 105 of the substrate 102 is exposed. In one embodiment, which can be combined with other embodiments described herein, the substrate 102 is disposed on the interior support 114 manually. In another embodiment, which can be combined with other embodiments described herein, the substrate 102 is disposed on the interior support 114 by a transfer robot. In yet another embodiment, which can be combined with other embodiments described herein, prior to the operation 301, one or more optical device 202 disposed on the substrate 102 may be diced along dicing paths along the perimeter of the one or more optical devices 202. For example, a laser ablation process or a filamentation process may be performed when the substrate 102 is positioned or prior to the operation 301 to form the dicing paths.

At operation 302, light is directed to the edge 105 of the substrate 102. The light may be directed from light source 108. The light source 108 may direct the light to the edge 105 through a focusing lens 106. The focusing lens 106 directs the light from the light source 108 to a slit 116. In the first configuration, the light source 108 is coupled to an exterior support 128 of the stage 104 such that the light source 108 is parallel to the edge 105 of the substrate 102. The focusing lens 106 is optically coupled to the light source 108 and extends to the slit 116 through an interior region 120 of the stage 104. In the second configuration, the light source 108 is coupled to the exterior support 128, a bottom support 126, and the interior support 114. The focusing lens 106 is coupled to a top surface 113 of the light source 108. The focusing lens 106 is positioned in line with the slit 116. In the first configuration and the second configuration, an exit thickness 111 of the focusing lens 106, corresponding to the thickness of the focusing lens adjacent the slit 116, is substantially equal to a thickness 124 of the substrate 102. The slit 116 corresponds to the thickness 124 of the substrate 102 such that the light is directed to the edge 105 and not directed outside of the inspection system 100. In the first configuration 101A, a reflective surface 110 is disposed on the focusing lens 106 to increase the amount of light directed to the edge 105 during the operation 302.

The positioning of the light source 108 and the focusing lens 106 allows for the facilitation of light from the light source 108 to the edge 105 of the substrate 102 with limited light escaping from the inspection system 100, such that as much of the light is directed to the edge 105. As such, the efficiency of the inspection process is improved as well as the quality of the inspection process. Further, the inspection system benefits from improved manufacturability compared to other inspection systems, due to the compact design and simple structure.

The light contacts the edge 105 of the substrate 102 and propagates through the substrate 102 via total internal reflection. The light is coupled out of the substrate 102 by the one or more optical devices 202 disposed on the substrate 102. The light coupled out of the substrate 102 creates a high contrast with the material of the substrate 102 and the stage 104 such that the one or more optical devices 202 are illuminated.

At operation 303, images of the substrate 102 are captured. The images are captured by a camera 112. The camera 112 is disposed above the substrate 102. At operation 304, the images are inspected. The images are inspected for defects on the substrate 102. The inspection system 100 is utilized to inspect the substrate 102 to detect whether there are at least one of fall-on particles, missing patterns, discoloration, or film non-uniformity of the substrate 102. In embodiments where the one or more optical devices 202 are diced along the dicing paths prior to the operation 301, the dicing paths may be inspected to determine the integrity of the dicing paths. For example, the dicing paths may be inspected for stress cracks along the dicing paths.

In summation, an inspection system for illumination of optical devices is provided herein. The inspection system includes a stage, a focusing lens, a light source, a reflective surface, and a camera. The inspection system is operable to provide a light to a substrate. The substrate is positioned on the inspection system such that an edge of the substrate is exposed. The inspection system focuses light to the edge such that the light propagates through the substrate. The light is coupled out of the substrate, illuminating one or more optical devices disposed on the substrate. The illumination allows the camera to capture images to be inspected. The images are inspected to detect defects of the substrate. The substrate may be inspected at multiple stages of the manufacturing process and each substrate may be inspected individually. The inspection system may be disposed on manufacturing equipment utilized during the manufacturing process, therefore providing for high throughput inspection of the substrate.

While the foregoing is directed to embodiments of the present disclosure, other and further embodiments of the disclosure may be devised without departing from the basic scope thereof, and the scope thereof is determined by the claims that follow.

What is claimed is:

1. An inspection system, comprising:
   a stage, the stage having:
      an interior support operable to retain a substrate having one or more optical devices disposed thereon;
      an exterior support; and
      a bottom support;
   a cover disposed on the exterior support, wherein the interior support, the exterior support, the bottom support, and the cover define an interior region, wherein the interior support and the cover define a slit;
   a light source operable to emit light, the light source disposed in the interior region; and
   a focusing lens operable to focus the light to the slit, the focusing lens optically coupled to the light source in the interior region, wherein:
      the light source is coupled to the exterior support in the interior region;
      the focusing lens extends between the light source and the slit; and
      a reflective surface is disposed between the interior support and the bottom support, the reflective surface operable to direct the light from the light source to the slit.

2. The inspection system of claim 1, wherein the reflective surface is coupled to the focusing lens.

3. The inspection system of claim 2, wherein the reflective surface is a film, sheet, or foil of reflective material.

4. The inspection system of claim 1, wherein an exit thickness corresponding to a thickness of a portion of the focusing lens adjacent to the slit is substantially equal to the slit.

5. The inspection system of claim 1, wherein the slit is between about 0.1 mm and about 2 mm.

6. A method of inspection, comprising:
   directing light from a light source to a substrate on an interior support of a stage of an inspection system, the substrate positioned such that an edge of the substrate is aligned with a slit in the inspection system, the slit defined by the interior support and a cover disposed on an exterior support of the stage, wherein the light source is disposed in an interior region of the stage and directs the light through the slit to the edge of the substrate to illuminate one or more optical devices disposed in or on the substrate;
   capturing images of the one or more optical devices; and
   inspecting the images for defects of the one or more optical devices, wherein a reflective surface disposed between the interior support and a bottom support of the stage directs the light through the slit.

7. The method of claim 6, wherein the interior region is defined by the interior support, the exterior support, the cover, and the bottom support disposed beneath the interior support and the exterior support.

8. The method of claim 6, wherein the images are captured with a camera disposed above the substrate.

9. The method of claim 6, wherein the slit corresponds to a thickness of the substrate such that the light contacts the edge of the substrate.

10. The method of claim 6, wherein the light illuminating the one or more optical devices disposed in or on the substrate includes the light contacting the edge of the substrate and propagating through the substrate.

11. The method of claim 6, wherein the light travels through a focusing lens to the slit, the focusing lens coupled to the light source in the interior region.

12. A method of inspection, comprising:
   forming dicing paths along a perimeter of one or more optical devices disposed in or on a substrate;
   directing light from a light source to a substrate on an interior support of a stage of an inspection system, the substrate positioned such that an edge of the substrate is aligned with a slit in the inspection system, the slit defined by the interior support and a cover disposed on an exterior support of the stage, wherein the light source is disposed in an interior region of the stage and directs the light through the slit to the edge of the substrate to illuminate one or more optical devices disposed in or on the substrate, wherein a reflective surface disposed between the interior support and a bottom support of the stage directs the light through the slit;
   capturing images of the one or more optical devices; and
   inspecting the images for defects along the dicing paths disposed around the perimeter of the one or more optical devices.

13. The method of claim 12, wherein the light illuminating the one or more optical devices disposed in or on the substrate includes the light contacting the edge of the substrate and propagating through the substrate.

14. The method of claim 12, wherein the interior region is defined by the interior support, the exterior support, the cover, and the bottom support disposed beneath the interior support and the exterior support.

15. The method of claim 12, wherein the slit corresponds to a thickness of the substrate, such that the light contacts the edge of the substrate.

16. The method of claim 12, wherein the inspecting the dicing paths for defects includes inspecting for stress cracks along the dicing paths.

17. The inspection system of claim 1, wherein the light source comprises a flexible printed circuit board disposed along the exterior support of the stage.

18. The inspection system of claim 1, wherein the focusing lens comprises a lens surface disposed at an angle relative to the bottom support and the angle is about five degrees to about 85 degrees.

19. The inspection system of claim 1, further comprising a camera positioned to and operable to capture images of the substrate and the one or more optical devices when illuminated by the inspection system.

20. The inspection system of claim 1, wherein the slit is between about 0.1 mm and about 2 mm.

* * * * *